J. WILLIAMS.
APPARATUS FOR SPRINKLING LIQUID POISON ON POTATO VINES.
No. 188,487. Patented March 20, 1877.
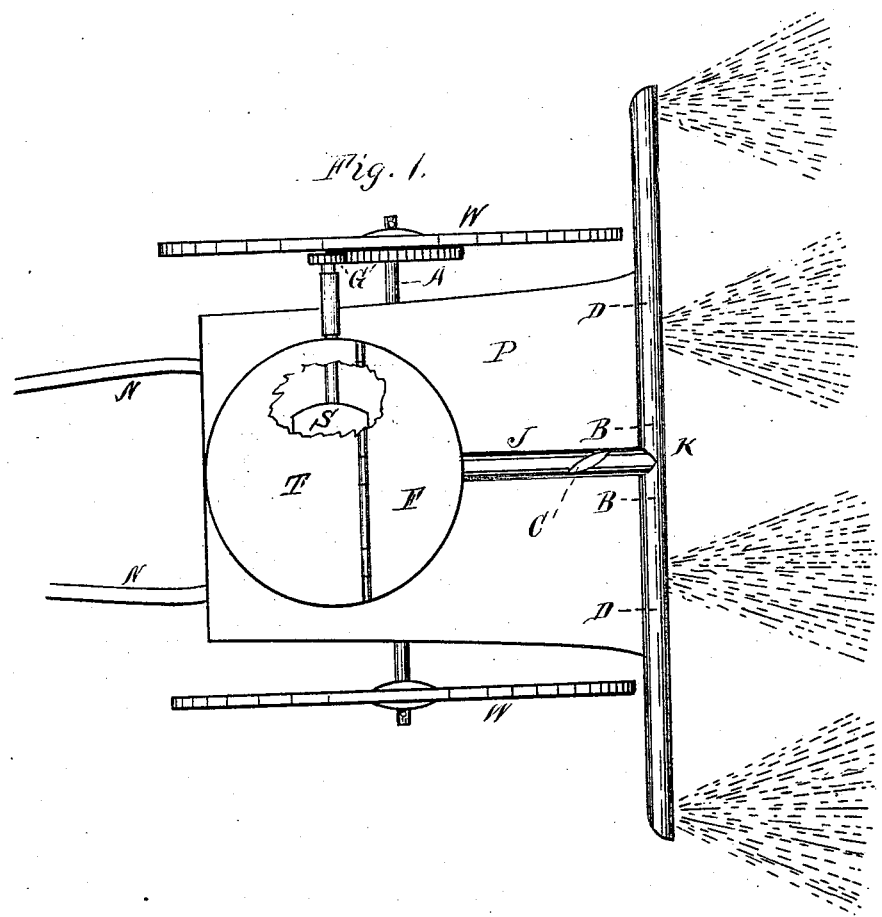
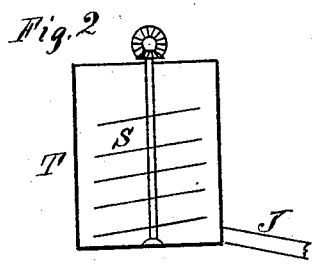
Witnesses
J. R. Hopper.
John Cooper.
Inventor.
John Williams.
By Thos. Loughborough
Atty.

UNITED STATES PATENT OFFICE.

JOHN WILLIAMS, OF LE ROY, NEW YORK.

IMPROVEMENT IN APPARATUS FOR SPRINKLING LIQUID POISON ON POTATO-VINES.

Specification forming part of Letters Patent No. 188,487, dated March 20, 1877; application filed January 5, 1877.

*To all whom it may concern:*

Be it known that I, JOHN WILLIAMS, of Le Roy, in the county of Genesee and State of New York, have invented a new and useful Apparatus for Sprinkling Liquid Poison on Potato-Vines; and I do hereby declare that the following is a full, clear, and exact description thereof, reference being had to the accompanying drawings, making part of this specification, in which—

Figure 1 is a top or plan view of my invention. Fig. 2 is a sectional elevation of a tank or liquid-holder, T, showing a modification of the stirrer or agitator S.

The object of this invention is to provide an apparatus to be drawn by a horse, for sprinkling liquid poison upon potato-vines to destroy bugs, whereby one person may treat fifteen or twenty acres per day, and do it much more effectually than can be done by hand, as heretofore practiced.

It consists in the employment of a cheaply-constructed two-wheeled cart, upon which the liquid-tank and sprinkling-pipes are mounted, and providing a suitable stirrer within the said tank, to be driven by one of the carrier-wheels.

I provide a cart consisting of two carrier-wheels, W, axle A, platform P, and thills N. Upon this platform I mount a cask, T, capable of holding one or two barrels. A pipe, J, leads from the bottom of this cask to a cross or transverse pipe, K, which is closed at its ends, and is provided with a group of fine perforations on the rear side, at each end, and two intermediately, leaving about three feet space between the groups, or to correspond with the distance between the rows.

This arrangement of the perforations, it will be seen, is for sprinkling four rows. They may be so arranged as to sprinkle more rows or less, as may be desired. The transverse pipe may be provided with a stop-cock, as indicated at B, on either side of the supply-pipe J, or as indicated at D, for the purpose of cutting off either of the outside sprinklers, or both on either side of the center.

The supply-pipe J is furnished with a stop-cock, C, to be closed while the machine is being turned around. A portion of the cask or tank cover may be hinged, as shown at F.

A great difficulty is experienced in using paris-green to poison potato-bugs, owing to the fact that it cannot be kept in suspension in the water without being constantly stirred up. The stirrer S is provided for this purpose, and it consists of a flat plate fixed to a shaft, by which it is suspended within the cask near the bottom. It is rotated, by means of the gearing G, from one of the ground or carrier wheels.

The stirrer-shaft may be hung vertically within the cask, if desired, as shown in Fig. 2, and provided with a series of spiral wings, which would elevate the paris-green and keep it thoroughly mixed with the water. This may be driven by a bevel-gear, or by a band running over idlers from the ground-wheel.

What I claim as my invention is—

In combination with a sprinkler-pipe, K, cask T and stirrer S, constructed and arranged to operate conjointly, substantially in the manner and for the purposes set forth.

JOHN WILLIAMS.

Witnesses:
 WM. S. LOUGHBOROUGH,
 A. L. MABBETT.